United States Patent

Ikegami

Patent Number: 5,887,008
Date of Patent: Mar. 23, 1999

[54] METHOD AND APPARATUS FOR GENERATING HIGH ENERGY COHERENT ELECTRON BEAM AND GAMMA-RAY LASER

[75] Inventor: Hidetsugu Ikegami, Takarazuka, Japan

[73] Assignee: Japan Science and Technology Corporation, Japan

[21] Appl. No.: 820,171

[22] Filed: Mar. 19, 1997

[30] Foreign Application Priority Data

Apr. 18, 1996 [JP] Japan .................................. 8-096560

[51] Int. Cl.$^6$ ........................................................ H01S 3/30

[52] U.S. Cl. ..................................................... 372/5; 372/2

[58] Field of Search .............................. 372/5, 2; 328/234

[56] References Cited

U.S. PATENT DOCUMENTS

| | | | |
|---|---|---|---|
| 4,975,891 | 12/1990 | Villa | 372/5 |
| 5,227,733 | 7/1993 | Yamada | 328/234 |
| 5,247,562 | 9/1993 | Steinbach | 372/5 |

*Primary Examiner*—Leon Scott, Jr.
*Attorney, Agent, or Firm*—Lorusso & Loud

[57] ABSTRACT

A function is introduced into a high energy electron storage ring or collider so as to form pulses of an electron beam each having a time width for causing coherence of electrons, thereby generating a high energy coherent electron beam. When a gamma-ray laser (GASER) is to be generated, a laser light projector is combined so as to cause coherent Inverse-Compton scattering of the laser light by the coherent electron beam, thereby generating a coherent gamma-ray, or GASER. This makes it possible to control elementary particle reaction and nuclear reaction (cross sections). Also, monochromaticity, directivity and luminance are improved.

4 Claims, 1 Drawing Sheet

METHOD AND APPARATUS FOR GENERATING HIGH ENERGY COHERENT ELECTRON BEAM AND GAMMA-RAY LASER

BACKGROUND OF THE INVENTION

1. Field of the Invention

The present invention relates to a method and apparatus for generating a high energy coherent negative and positive electron beam and a gamma-ray (Gamma-ray Amplification by Stimulated Emission of Radiation; GASER), and more specifically to a method and apparatus for generating a high energy coherent electron beam and GASER of the energy region of elementary particle reaction and nuclear reaction (cross sections).

2. Description of the Related Art

Since G. P. Thomson verified the wavemotion of an electron beam, electron microscopes utilizing interference of uniform momentum electron beams have been developed and commonly used. However, since momentum high resolution is generally required for the particle beam to exhibit properties of wave, only electron beams of up to 1 MeV can be practically used. There has not yet been found a method of generating a high energy coherent electron beam that can be used for generating a gamma-ray laser (GASER) or for controlling cross sections of elementary particle reaction or nuclear reaction.

Therefore, there is a demand for a simple and practical method of generating a high energy coherent electron beam and a gamma-ray laser (GASER).

SUMMARY OF THE INVENTION

The present invention extends the Bose-Einstein condensation concept in the space-momentum phase space of a group of atoms having weak mutual interaction, and shows that the time-energy phase space of a beam of accelerated particles can potentially achieve time-coherence (time correlation).

A description will now be given of a method for generating a high energy time-coherent electron beam having high energy and time-coherence property, or a coherent electron beam. Further, the possibility of realizing reactivity control of resonant elementary particle reaction in electron colliders will be shown as an example of utilization of the behavior of a group of electrons in a same phase in an electron beam in which they behave as if they were a single particle. An object of the present invention is to provide a method and apparatus for generating GASER by coherent Inverse-Compton scattering (CCS) of a laser beam with a coherent electron beam.

In order to achieve the above mentioned object, the present invention provides:

(1) a method for generating a high energy coherent electron beam, through using an electron storage ring or an electron collider, and introducing a function of forming pulses each having a time width for causing coherence of electrons;

(2) a method for generating a gamma-ray laser (GASER), wherein there is generated a GASER of high quality in terms of monochromaticity, directivity, and luminance in the same direction with an electron beam, through projecting a laser beam in the direction opposite to that of a coherent electron beam, which causes coherent Inverse-Compton scattering (CCS), thereby amplifying the photon energy of scattered laser; and (3) an apparatus for generating an above-mentioned high energy coherent electron beam and GASER.

DESCRIPTION OF THE PREFERRED EMBODIMENTS

Figure 1:
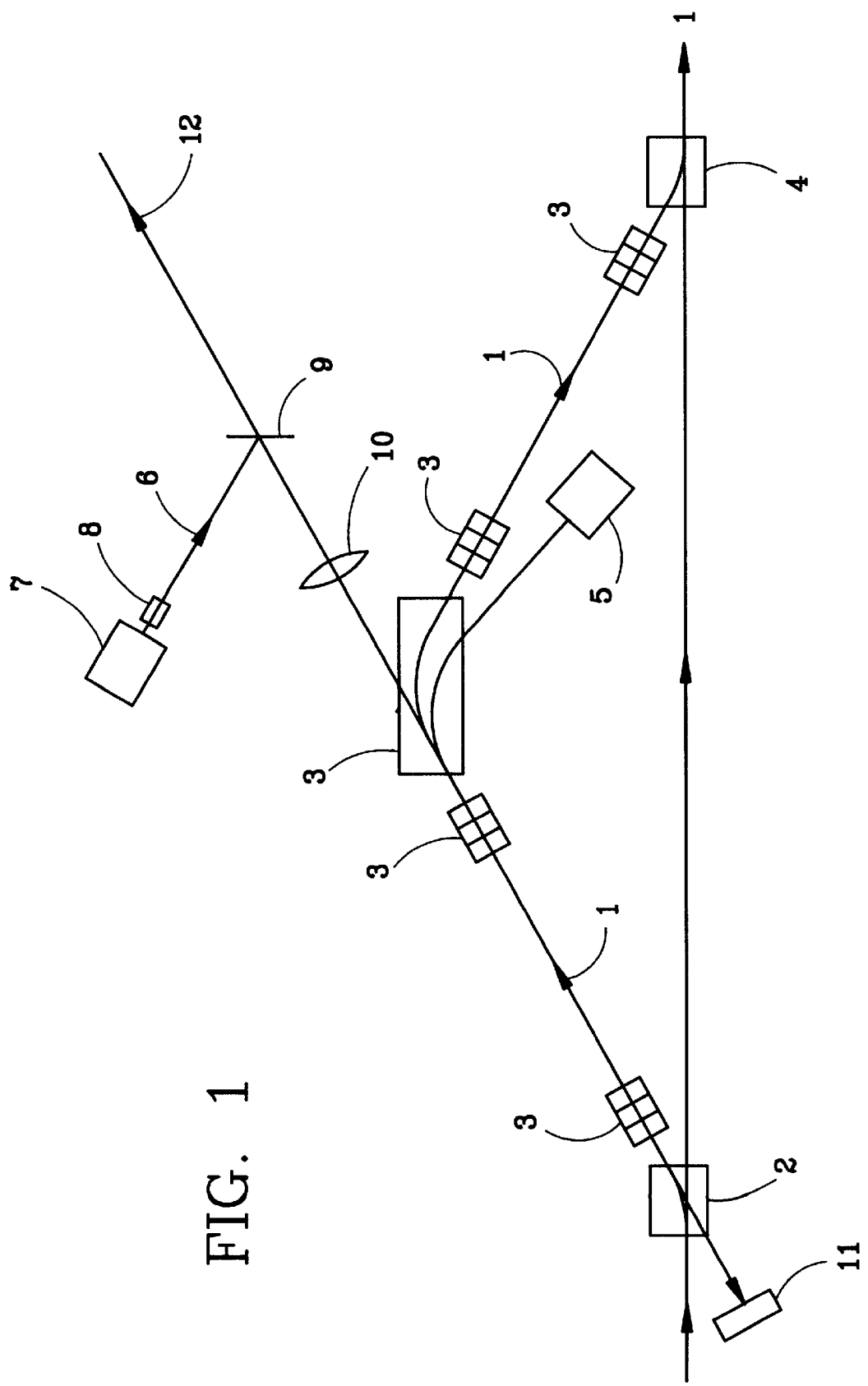
FIG. 1 is a schematic diagram of an apparatus for generating a high energy coherent electron beam and GASER according to an embodiment of the present invention.

Embodiments of the present invention will now be described below in detail, starting with a first embodiment.

In an electron beam having a total energy $\gamma m_0 c^2$ and an energy resolution $\gamma/\Delta\gamma$, the thermal energy $(½)kT_{11}$ of a group of electrons in the direction of the electron beam is given by Equation (1):

$$(½)kT_{11} = (m_0 c^2/2\beta^2)(\Delta\gamma/\gamma)^2, \qquad (1)$$

where $m_0$ is the rest mass of an electron, c is the velocity of light, and $m_0 c^2$ is the rest energy of an electron, which is 0.511 MeV. $\gamma$ is a relativistic energy factor and is related with electron beam speed $\beta$ c by Equation (2):

$$\gamma^{-2} = 1 - \beta^2, \qquad (2)$$

where k is Boltzmann's constant and $T_{11}$ is the temperature of the electrons in the direction of the electron beam.

The inventors of the present invention have proposed a technique for generating a coherent beam of electric-charged particles (see Japanese Patent Application No. 6-326510 entitled "Method and Apparatus for Generating Coherent Electric-Charged Particle Beam"). Here, this technique is applied to an electron beam having a high relativistic energy. When the time width $t_p$ of the electron beam pulse in a laboratory frame satisfies Equation (3):

$$t_p < (2\gamma h/kT_{11}), \qquad (3)$$

the group of the electrons in the pulse exhibits quantum effect or wave properties. Combining Equations (3) and (1), we obtain Equation (4):

$$t_p < (2\lambda_e/c)(\beta^2\gamma)(\gamma/\Delta\gamma)^2 \qquad (4)$$

where h is Planck's constant and $\lambda_e/2\pi$ is the Compton wavelength of an electron and equal to $h/2\pi\, m_0 c$, or $3.86 \times 10^{-13}$ m.

The condition of Equation (4) was obtained by converting the condensation condition of a group of weakly interacting reacting atoms in space-momentum phase space, which was proposed by A. Einstein in 1924, into time-energy phase space of a free particle rest frame. Therefore, the former condensation, referred to as "Bose-Einstein condensation," and the latter, referred to by the present inventors as "time-coherence," are equivalent. Therefore, the group of particles in time-coherence are all in the same phase as the group of atoms in Bose-Einstein condensation, and comprise a coherent particle beam as defined in the above-mentioned Japanese Patent Application No. 6-326510.

From Equation (4) it is apparent that a coherent electron beam is easily obtained, when a high energy electron beam with high energy resolution is available or an electron beam with a large $\gamma$ and a large $(\gamma/\Delta\gamma)$ is available, even if the time width $t_p$ of the electron beam pulse is relatively long due to the relativistic time dilation effect. Therefore, in addition to conventional electron beam synchrotron acceleration, generation of a coherent electron beam can be realized through introduction of pre-buncher if required or by extracting electron beam pulses.

The main feature of a coherent electron beam is that the group of electrons in a pulse behave coherently as if they were a single particle with an electric charge Ne and a static mass $Nm_0$, where N is the number of electrons in a pulse. Next will be discussed an embodiment of a coherent electron beam, wherein negative and positive electron beams are made coherent in a collider for high energy electrons and positive electrons.

For the sake of simplicity, the number of electrons in each colliding pulse is assumed to be the same and equal to N. Generally speaking, the incident channel of electron induced reactions is attributable to Coulomb interaction. Therefore, the collision cross section is independent of the kind of resonant reaction (incident channel) and proportional to $$\alpha = e^2/2\epsilon_0 hc, \tag{5}$$

where $\alpha$ is referred to as a fine structure constant and $\epsilon_0$ is the dielectric constant in vacuum. Therefore, as shown in Equation (6), the resonant reaction rate R per pulse is proportional to the product of $\alpha$, N and the number density $\rho$ of electrons.

$$R \propto \alpha N \rho \tag{6}$$

However, for collisions of coherent electron beams, N in Equation (6) becomes 1 and e in Equation (5) becomes Ne, because the group of electrons in a pulse behave as if they were a single particle. Therefore, in this case, reaction rate $R_c$ per pulse in this case becomes the product of N and the reaction rate R of the ordinary non-coherent electron beam:

$$R_c \propto \alpha N^2 \rho = NR. \tag{7}$$

In practice, the actual value of N in Equation (7) will be somewhat reduced because the present embodiment neglects other dynamics such as the extent of time and space overlap in the colliding pulses and the reactive resonance width. However, even if those effects are taken into consideration, a considerable increase in research efficiency is expected, and the possibility of realizing elementary particle/nuclear reaction control arises.

Next will be discussed a second embodiment of the present invention, wherein a laser beam is projected in the direction opposite to that of a high energy coherent electron beam. In this case, there can be applied the discussion described in Japanese Patent Application No. 8-30203 entitled "Method and Apparatus for Generating a Super Hard LASER", in which the inventors of the present invention refer to the theory in which J. J. Thomson' equation is replaced by Klein-Nishina's equation. See, E. Feenberg and H. Primakoff, Physical Review 73, 449 (1948). Namely, the projected photon energy hv is amplified to hv' by coherent Inverse-Compton scattering (CCS) as shown by Equation (8):

$$hv' = 4\gamma^2 hv/[1+(\gamma\theta)^2+(4\gamma hv/m_0 c^2)] \approx 4\gamma^2 hv \tag{8}$$

where $\theta$ is emission angle of the emitting photons in the experimental room system, and the solid angle of emission becomes:

$$\pi\theta^2 = 4\pi(\gamma_\perp^2 - 1)/\gamma^2, \tag{9}$$

where $\gamma_\perp$ is the relativistic energy factor of thermal motion of the electrons in a transverse plane perpendicular to the electron beam.

Through the above-describe amplification of the photon energy, the projected laser beam is emitted as a gamma-ray laser GASER that is coherent in the direction of the electron beam.

Therefore, the photon energy hv' of the GASER by coherent Inverse-Compton scattering (CCS) according to the present invention can be freely varied with the photon energy hv of the projected laser beam or with the total energy $\gamma m_0 c^2$ of the electron beam. Since the GASER maintains substantially 100% of the polarization of the projected laser beam, the polarization of the GASER beam can be freely controlled through adjustment of the polarization of the projected laser beam. In addition, since CCS generated by a coherent electron beam is applied, the effective scattering cross section becomes N times that of Klein-Nishina, where N is the number of electrons in each electron beam pulse. Namely, for a given electron beam intensity and projected laser beam intensity, GASER generation efficiency becomes higher than that of a conventional laser Inverse-Compton scattering (LCS)-γ-ray beam by a factor of $N=10^4-10^6$. Additionally, the emission solid angle of GASER is small, as shown by Equation (9), and has a sharp directivity compared with that of the conventional LCS-γ-ray beam.

For example, for a high performance electron storage ring with electron energy of 2000 MeV (γ=4000), and $$\gamma_\perp = 1.4,$$

the emission solid angle is as small as 770 nsr (nano steradians) and there can be expected generation of a GASER which has more than ten times the luminance of an LCS-γ-ray beam.

With reference to the drawing, a detailed description will now be given of a second embodiment of the present invention regarding the generation of the coherent electron beam and the generation of GASER utilizing. In order to avoid repetition, the first embodiment is not described here again, because the first embodiment can be easily understood from the description of the beam pulsing of the second embodiment and the assumption that a pre-buncher is introduced to the colliders if necessary.

FIG. 1 is a schematic diagram of an apparatus for generating a coherent electron beam and a GASER according to the present invention. The apparatus has a high energy electron storage ring, wherein electron energy $\gamma m_0 c^2 = 2000$ MeV or γ=4000, energy resolution is $\Delta\gamma/\gamma = 10^{-4}$, and thermal energy in a transverse plane $$(\gamma_\perp - 1) m_0 c^2$$

is substantially equal to $\Delta\gamma m_0 c^2 = 0.20$ MeV.

In this figure, numeral 1 denotes an electron beam, numeral 2 denotes an electron beam pulse separator, numeral 3 denotes a beding magnet, numeral 4 denotes an electron beam pulse injection magnet, and numeral 5 denotes a beam dump for processing non-recovered electrons. Numeral 6 denotes a laser beam, numeral 7 denotes a laser source, numeral 8 denotes a laser polarization adjuster, numeral 9 denotes a laser reflection mirror, numeral 10 denotes a focusing lens, numeral 11 denotes a laser beam intensity monitor, and numeral 12 denotes a gamma-ray laser (GASER).

According to Equation (4), in the present embodiment of the invention, a coherent electron beam is generated when the time width $t_p$ of the pulsed electron beam is not longer than 6.5 ns (nano seconds). According to Equation (8), when a Nd:YAG laser beam is projected onto the obtained coherent electron beam, a GASER with 77 MeV of photon energy is expected to be generated.

The present invention is not limited to the embodiments described above. Numerous modifications and variations of the present invention are possible in light of the spirit of the invention. For example, the pulse separator can be replaced by a combination of energy dispersion system and a pre-buncher, or the same system can be built in the storage ring or a collision apparatus without a branch channel, so that the electron beam can be made into a pulsed coherent electron beam. Those are not excluded from the scope of the present invention.

The present invention provides the following advantages:

(A) A high energy coherent electron beam can be generated by forming pulses of an energy high resolution electron beam, each having a proper time width so that coherence of electrons occurs, utilizing a high energy electron storage ring or a high energy electron collider. Compared with that in a conventional collider, the reaction rate of the resonant reaction induced by the coherent electrons in the collider becomes higher by a factor substantially equal to the number of electrons in a pulse. This can lead a new method for controlling elementary particle reaction and nuclear reaction (cross sections).

(B) A GASER of high quality in terms of monochromaticity, directivity and luminance in the same direction with an electron beam can be generated by projecting a laser beam in the direction opposite to that of the coherent electron beam, inducing coherent Inverse-Compton scattering (CCS) and amplifying the energy of the scattered laser photons.

(C) Compared with an LCS-γ-ray of traditional laser Inverse-Compton scattering, the GASER realize a generation efficiency higher by a factor equal to the number of electrons in the coherent electron beam pulse. For a given electron beam intensity and projected laser beam intensity, the generation efficiency becomes higher by a factor of $N=10^4-10^6$. Also, an excellent directivity can be obtained. Accordingly, the luminance incomparably increases.

What is claimed is:

1. An apparatus for generating a gamma-ray laser, comprising:

a storage ring or collider for high energy negative/positive electrons for generating an electron beam and protecting the electron beam in a first direction;

means for forming pulses in the electron beam, each pulse having a time width causing coherence of electrons within the pulse, so that the electrons within the pulse behave as if they are a single particle; and means for projecting a laser beam in a second direction, opposite to said first direction and into collision with the pulsed electron beam, thereby amplifying photon energy of the laser by coherent Inverse-Compton scattering so as to generate a gamma-ray laser.

2. A method for generating a high energy coherent electron beam comprising:

generating an electron beam, projected in a first direction, using a storage ring or collider for high energy negative/positive electrons, said electron beam being pulsed with each pulse having a pulse width causing coherence of electrons within the pulse so that said electrons within the pulse behave as if they are a single particle; and separately generating a laser beam and projecting said laser beam in a second direction, opposite said first direction and into collision with said electron beam, whereby photon energy of said laser beam is amplified by coherent Inverse-Compton scattering, thereby generating a gamma-ray laser.

3. A method according to claim 2 wherein said pulse time width is no greater than 6.5 nano seconds.

4. A method according to claim 2 wherein an electron beam is first generated and subsequently separated into pulses.

* * * * *

UNITED STATES PATENT AND TRADEMARK OFFICE
CERTIFICATE OF CORRECTION

PATENT NO. : 5,887,008
DATED : March 23, 1999
INVENTOR(S) : Hidetsugu IKEGAMI

It is certified that error appears in the above-identified patent and that said Letters Patent is hereby corrected as shown below:

Col. 6, line 4, delete "protect-" insert --project- --.

Signed and Sealed this

Twenty-seventh Day of June, 2000

Attest:

Q. TODD DICKINSON

Attesting Officer

Director of Patents and Trademarks